(No Model.)
C. C. HARLOW.
LUBRICATOR.
No. 295,919. Patented Apr. 1, 1884.
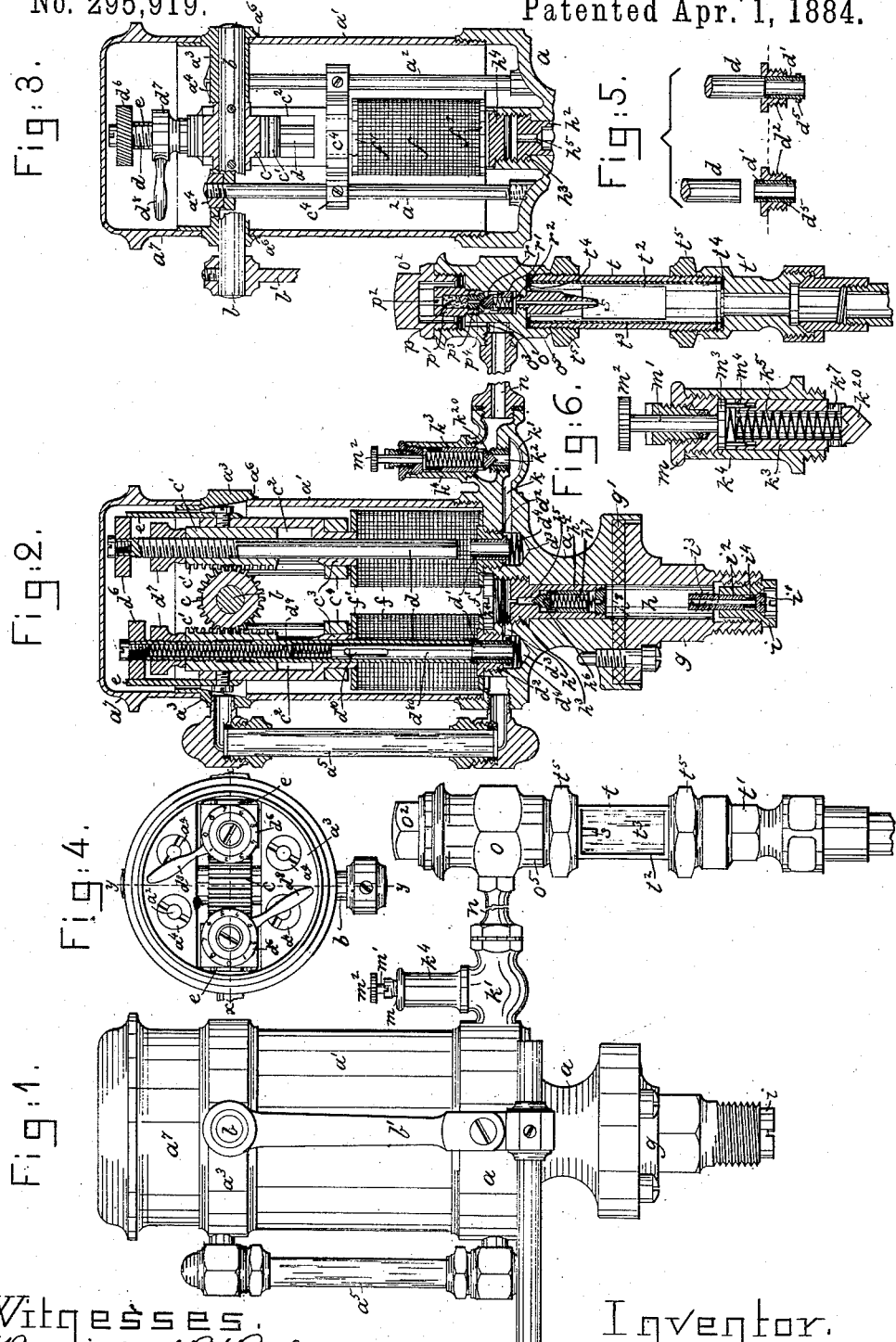
Witnesses.
Benjamin P. Ryder.
John F. C. Printerl
Inventor.
Cushing C. Harlow
by Crosby & Gregory attys.

UNITED STATES PATENT OFFICE.

CUSHING C. HARLOW, OF BROCKTON, MASSACHUSETTS.

LUBRICATOR.

SPECIFICATION forming part of Letters Patent No. 295,919, dated April 1, 1884.

Application filed November 30, 1883. (No model.)

*To all whom it may concern:*

Be it known that I, CUSHING C. HARLOW, of Brockton, county of Plymouth, State of Massachusetts, have invented an Improvement in Lubricators, of which the following description, in connection with the accompanying drawings, is a specification, like letters on the drawings representing like parts.

My invention, relating to lubricators, is shown as embodied in a lubricator for forcing the lubricant against a pressure, as is required for lubricating the valves and pistons of engines; but the forcing apparatus may be employed to insure a definite rate of delivery when no pressure is to be overcome.

The invention consists in various details of construction, whereby the efficiency and accuracy of the lubricator are increased, and whereby the lubricator may be made to supply the lubricant at various points from a single reservoir and actuating mechanism, the quantity delivered at each point being capable of independent regulation or adjustment.

Figure 1 is a side elevation of a lubricating apparatus embodying this invention; Fig. 2, a vertical section thereof on line $x$, Fig. 4; Fig. 3, a vertical section thereof on line $y$, Fig. 4; Fig. 4, a plan view of the lubricator with the top cap removed, and Figs. 5 and 6 details to be referred to.

The reservoir from which the lubricant is to be supplied to the various parts of the engine is composed of a base, $a$, upon which is fastened the side $a'$, which may be of glass to show its contents, or may be of metal, in which case a glass tube, $a^5$, will be employed to show the level of the lubricant, the side of the reservoir being shown in this instance as of metal, cylindrical in shape, and screwed into a threaded flange on the said base.

Upon the base $a$ are fixed posts $a^2$, which, together with the side $a'$, support a top piece, $a^3$, fastened upon the said posts by nuts $a^4$, and constituting the bearing for a rock-shaft, $b$, extending across the reservoir, and to the outside thereof, where it has attached to it a rocker-arm, $b'$, adapted to be connected with any convenient moving part of the engine, by which the said arm and shaft are oscillated to actuate the oil-forcing devices of the lubricator. The actuating rock-shaft $b$ has fixed upon it one or more pinions, $c$, meshing with racks $c'$, having a sliding movement in guides $c^2$, shown as each having a cylindrical foot, $c^3$, supported in a yoke or cross-bar, $c^4$, fixed upon the posts $a^2$. The top piece, $a^3$, is flanged, as shown at $a^6$, Figs. 2 and 3, and fits over the upper end of the cylinder $a'$, and the said top piece has an opening through which the rack-guides $c^2$ and the pinion $c$ extend, the said opening also serving for the introduction of the lubricant into the reservoir, which is provided with a removable cap or cover, $a^7$, fitting on the top piece, $a^3$, and inclosing and protecting the working parts and preventing the ingress of dust to the contents of the reservoir.

When the rock-shaft $b$ is oscillated, the racks $c'$ have an upward and downward movement in their guides, and the said racks have connected with them the actuating-rods $d$ of the oil-forcing devices, consisting in this instance of short tubes or nipples $d'$, fitted to move longitudinally in bushings $d^2$, fixed in the base $a$, and forming connecting-passages between the reservoir above the said base and recesses or chambers $d^3$, formed in the said base. The said nipples $d'$ are normally pressed upward by springs $d^4$, and their upward movement is limited by collars or shoulders $d^5$ on the nipples $d'$. (Best shown in Fig. 5, which is intended to illustrate the operation of the said forcing-nipples.) The actuating-rods $d$, in their upward movement, produced by the racks $c'$, are raised above the ends of nipples $d'$, as shown at the right hand in Fig. 2 and at the left hand in Fig. 5, thus permitting the contents of the reservoir to pass down through the nipple and fill the chamber $d^3$ in the base $a$ of the lubricator. When the rods $d$, in their downward movement, reach the nipples $d'$, they close tightly upon the upper ends of the said nipples, and in the further movement depress the said nipples with them, thus forcing out a portion of the contents of the chamber $d^3$, and it will be seen that the amount forced out at each stroke of the rods $d$ depends upon the distance the said rods move after they have come in contact with and closed the ends of the nipples $d'$, and not upon the entire stroke or range of movement of the said rods. Thus, while the actuating-racks $c'$ make a uniform stroke of greater length of movement than is required for the maximum forcing movement of the rods $d$ after they have come in contact with the nipples $d'$, the said forcing movement may be regulated by varying the position of the rods $d$ longitudinally with relation to the said racks, and the limit of the downward movement of the lower ends of the said rods $d$ may be varied, although the stroke of the racks remain practically constant.

In order to facilitate the adjustment of the rods $d$ with relation to the racks, the said rods are provided with milled heads $d^6$, and the rack-guides $c^2$ are provided with gaging uprights $e$, the upper ends of which are just even with the upper edge of the milled heads $d^6$, when the lower ends of the rods $d$ arrive at the nipple $d'$, and the rods thus begin their forcing or effective movement, so that by observing the distance that the milled head descends below the bar $e$, the amount of oil forced out at each stroke will be known, the face of the said upright adjacent to the milled head being properly graduated to assist in such observation.

When it is desired to vary the amount forced by one of the rods, the milled head will be turned to raise or lower the rod in the rack, and in order to enable the operator to turn it the proper amount, the said milled head is graduated, as shown in Fig. 4. When properly adjusted, the further movement of the rod $d$ is prevented by means of a check-nut, $d^7$, engaging the upper end of the rack $c'$, the said check nut being shown as provided with a handle, $d^8$, to enable it to be more easily turned down tightly.

The oil or other material passing from the reservoir to the forcing devices $d$ $d'$ is caused to pass through strainers $f$, consisting of cylinders of gauze connected at their upper and lower ends with collars $f'$ $f^2$, the one at the upper end fitting over the foot of the rack-guide $c^2$, while the one at the lower end fits around the bushing $d^2$, in which the nipple $d'$ operates. By means of these strainers, foreign sedimentary or gritty matter is prevented from entering the forcing parts and passing through the valves, to be hereinafter described. When the lubricant is intended to be used for lubricating the valves and pistons of an engine, the lubricator may be mounted directly upon the steam-chest, in which case the base $a$ will preferably be provided with a foot, $g$, adapted to screw into an opening in the steam-chest; and in order to prevent too great heating of the contents of the reservoir, the base $a$ is preferably separated from the foot $g$ by material that is a bad conductor of heat—such, for instance, as asbestus board, a layer of which is shown at $g'$—thus breaking up the metallic continuity between the steam-chest and the reservoir.

The forcing device at the left hand in Fig. 2 is shown as operating to deliver the lubricating material through the base and foot $g$ into the steam-chest, the said base and foot having a passage, $h$, the upper end of which is enlarged and screw-threaded for a short distance, as shown, and communicates by a passage, $h'$, with the chamber $d^3$, from which the lubricant is forced, as before described. A cylinder or tube, $h^2$, fitting the passage $h$, is provided with a threaded head, $h^3$, which screws down in the threaded recess at the upper end of the head $h^3$, being below the passage $h'$, which enters a small chamber formed above the said head $h^3$, between it and a short screw, $h^4$, closing the upper end of the passage $h$. The head portion of the cylinder $h^2$ is provided with a small passage, $h^5$, leading from the said chamber above it, and provided at its lower end with a valve-seat that co-operates with a valve, $h^6$, the end of which is pointed or conical in shape to fit its seat, and is contracted or of smaller diameter than the bore in the main portion of the tube $h^2$ for a short distance, so as to afford a passage around it and within the tube for the fluid when the valve is unseated. The stem of the valve $h$ is tubular and fits within the tube $h^2$, which forms a guide for it in its movement to and from its seat, and a spring, $h^7$, tends to hold the said valve to its seat, the said spring being supported on a short screw, $h^8$, in the lower end of the tube $h^2$. The valve-stem is provided with openings leading from the space in the tube $h^2$ around the contracted portion before mentioned to the interior of the valve-stem, and the screw $h^8$ has a small passage through it, so that the liquid forced by the rod $d$ and nipple $d'$ from the chamber $d^3$ passes through the passage $h'$ into the chamber below the screw $h^4$, thence through the passage $h^5$, unseating the valve $h^6$, then through the tube $h^2$ around the contracted upper end of the valve-stem, and then into the interior of the valve-stem, through which it passes, and finally escapes through the passage in the screw $h^8$ into the passage $h$ of the foot $g$. The lubricant in this manner keeps the spring $h^7$ and the valve-stem well lubricated, the working parts being all practically immersed in oil. The lower end of the passage $h$ in the foot $g$ is shown as also provided with a threaded bushing or tubular screw, $i$, shaped at its lower end to form a valve-seat for a valve, $i'$, having a stem, $i^2$, fitted to move longitudinally in the bushing $i$, and normally acted upon by a spring, $i^3$, tending to keep the valve to the seat. The stem $i^2$ is made tubular to permit the oil to pass through it, and just above the valve is reduced in external diameter to permit the fluid to pass around it, the stem having one or more lateral passages, $i^4$, connecting its central bore or passage with the external space formed by reducing its diameter. The two valves $h^6$ $i'$ effectually prevent the entrance of steam to the lubricator, and also prevent the lubricant from being forced back into the chamber $d^3$ while the rod $d$ is rising. The rod $d$ is shown as made tubular and provided with a light-fitting internal rod, $d^{20}$, which may move longitudinally therein, and is acted upon by a spring, $d^9$, tending to hold it in its lowest position, the said spring being sufficient to overcome the normal back-pressure upon the oil, but yielding in case any obstruction should occur, and thus preventing the breakage of the parts. The internal rod, $d^{90}$, is slotted, as shown at $d^{10}$, and its movement relative to the tubular outer portion is limited by a pin passing through the outer tubular portion and the said slot $d^{10}$.

When the lubricator is intended to supply the lubricant at a point not directly beneath it, the arrangement shown at the right-hand part of Fig. 2 may be employed, in which the chamber $d^3$ communicates by a passage, $k$, with a valve-casing, $k'$, having an independent seat, $k^2$, shown as made of hardened steel, screwed into the usual partition formed in the valve-casing.

The valve $k^{20}$ is similar in construction to the one, $h^6$, previously described, it having a tubular stem, $k^3$, operating in a tubular guide, $k^4$, on the valve-casing $k'$, the said stem containing a spring, $k^5$, by which the valve is pressed to its seat, and being provided with small inlet-openings $k^7$, admitting the lubricant to the interior of the valve-stem, and thus lubricating its spring. This valve, with its stem and guide, is shown on a larger scale in Fig. 6, and the upper end of the stem-guide $k^4$ may be closed by a plug, $m$, shown in this instance as made to form a stuffing-box, through which passes a stem, $m'$, having a milled head, $m^2$, or other means for rotating it from the outside of the valve, and provided at its other end with a head or disk, $m^3$, having pins $m^4$, which engage passages in end of the valve-stem $k^5$, permitting its longitudinal movement to and from its seat, but causing the said valve-stem to rotate with the said disk $m^3$ when it is turned by the milled head $m^2$, thus presenting a new wearing-surface between the valve and its seat and operating to crush or grind up gritty matter, if any should be caught upon the valve-seat.

The lubricant forced through the valve $k^{20}$ may be led through a suitable pipe, $n$, to any point where it is desired to supply the lubricant, and, if desired, it may be delivered through a sight-feed device, or one in which the lubricant is caused to issue, drop by drop, through a suitable orifice or nozzle, the drops falling through a tube provided with transparent openings, through which the falling drops may be seen, and the rapidity of the feed thus estimated.

Sight-feed devices are common in lubricators in which the lubricant issues by gravity from a reservoir; but such devices are not adapted to be used in connection with devices for forcing the lubricant against pressure. The sight-feed device employed in the present invention has its upper end composed of a casting, $o$, having a longitudinal passage, $o'$, through it, and enlarged threaded recesses at the ends of the said passage, the upper of which is closed by a threaded cap or plug, $o^2$, thus making a chamber, which communicates by an inlet-passage, $o^3$, with the pipe $n$, leading from the lubricator, the said pipe being connected with the part $o$ by a suitable screw-thread or coupling.

In order to cause the oil to issue uniformly from the said chamber, into which it is received by intermittent impulses from the forcing device of the lubricator, the passage $o'$ is provided with a retarding device to check the flow of oil through it and render it uniform instead of intermittent. The flow is thus retarded by means of fibrous or porous packing $p$, shown as contained in a small chamber, $p'$, having a small inlet-opening, $p^2$, at its upper end, having a threaded neck, $p^3$, by which it is fastened in the passage $o'$. The said chamber $p'$ is closed at its lower end by a short screw, $p^4$, having a central passage, and a valve-seat for a valve, $r$, having a hollow stem, $r'$, and spring $r^2$, by which it is held to its seat, its construction and operation being precisely like those of the valve $h^6$, previously described. The said valve $r$ co-operates with the fibrous packing to retard the flow of oil, which passes down through the stem of the said valve with a practically-uniform flow, and is delivered into the tapering nozzle $s$, screwed into the lower end of the passage $o'$, and causing the oil to form drops by capillary attraction in the usual manner, which drops fall from the said nozzle at uniform intervals of time.

The casing $o$ is provided at its lower end with a coupling-piece, $t'$, by which the device may be connected with the part to be lubricated. The oil dripping from the nozzle falls through the said tube $t$; and in order to permit the drops to be seen, so that the rapidity of the delivery may be estimated, the said tube $t$ is provided with openings $t^2$, and contains an internal glass tube, $t^3$, through which the drops may be seen. The ends of the said tube $t^3$ are pressed into suitable washers, $t^4$, making the tube perfectly tight, and check-nuts $t^5$ on the tube $t^3$ secure it from rotary movement in the top piece, $o$, and coupling-piece $t'$.

It will be seen that all the working parts of the lubricator except the oscillating arm $b'$ are contained within the reservoir, and are protected thereby as well as being kept thoroughly lubricated.

The pinion $c$ may be turned to any desired position with relation to the racks $c'$ when putting it in mesh therewith, so that the arm $b'$ may extend in any desired direction from the lubricator, enabling it to be actuated either by a vertically or horizontally moving part of the engine with equal facility.

The rock-shaft $b$ may be provided with any desired number of pinions, $c$, each engaging one or more racks and actuating independent forcing devices, from which the lubricant may be conducted to any desired point, each of the said forcing devices being capable of adjustment independent of the others, so that the quantity delivered at each point may be regulated as desired.

The forcing-nipple $d'$ may have as long a bearing in the bushing $d^2$ as is required to insure a tight fit and to reduce the wear, and by having the actuating-rods $d$ seat or close upon the ends of the nipples, as described, the ends of the said nipples are tightly closed with a minimum amount of wear, and there is no danger of leakage between the nipple and the rod.

I claim—

1. In a lubricator, the reservoir having two or more outlet-passages, combined with a series of independent forcing devices actuated in common, by means of which different quantities of the lubricant may be forced from each outlet as desired, substantially as described.

2. In a lubricator, the reservoir and forcing-rod therein, combined with the actuating rock-shaft and pinion thereon, and rack meshing with the said pinion and connected with the said forcing-rod, substantially as described.

3. The reservoir for the lubricant and the actuating rock-shaft, pinion, and rack, combined with the forcing-rod $d$, adjustable longitudinally in the said rack, substantially as and for the purpose described.

4. The reservoir and internal threaded actuating-rack, combined with the threaded forcing-rod connected with the said rack, and the gaging-upright co-operating with the said rod to indicate its effective movement, substantially as described.

5. The oil-reservoir and forcing device, consisting of a longitudinally-movable nipple and independent actuating-rod adapted to seat on the end of the said nipple, close the passage through it, and then move the said nipple longitudinally, substantially as and for the purpose described.

6. The oil-reservoir having a chambered base provided with a bushing, combined with the spring-pressed forcing-nipple, longitudinally movable in the said bushing, and provided with a stop limiting its movement caused by the spring, and the actuating-rod seating on the end of the said nipple and moving it therewith, substantially as described.

7. In a lubricator, the reservoir provided with a foot adapted to be attached to a steam chest or cylinder, combined with non-conducting material interposed between the main portion of the reservoir and its foot, whereby the said reservoir and its contents are protected from the heat of the steam chest or cylinder, substantially as described.

8. The forcing-rod having a spring-held portion adapted to yield when the flow of the forced liquid is obstructed, as and for the purpose described.

9. In a lubricator, the reservoir and forcing device thereon, combined with the strainer, consisting of a gauze cylinder, $f$, provided at its ends with rings $f'$, the said strainer surrounding the said forcing device, substantially as described.

10. The reservoir having a chambered base provided with an outlet-passage, combined with a forcing device for expelling the liquid from the chamber of the base, and a valve controlling the flow through the outlet-passage, provided with a tubular stem and spring within the said stem, which is provided with inlet-openings admitting the lubricant to the interior thereof, substantially as described.

11. The reservoir having its base provided with a chamber, $d^3$, and outlet-passage $h$, combined with the tube $h^2$ and valve $k$ therein, and the screw $h^4$, closing the upper end of the passage $h$, which communicates with the chamber $d$, substantially as described.

12. The lubricator having a forcing device, combined with the sight-feed device having a chamber connected with the outlet-passage from the forcing device, a drop-forming nozzle, and a retarding device between the said chamber and nozzle, whereby the lubricant entering the chamber intermittingly is delivered uniformly to the nozzle, substantially as described.

13. The lubricator having a forcing device, and the sight-feed device having a receiving-chamber at its upper end, an outlet-passage therefrom terminating in a drop-forming nozzle, combined with fibrous material interposed between said receiving-chamber and nozzle, substantially as described.

14. The combination of the valve-seat $k^2$, valve $k^{20}$, and device for rotating the said valve with relation to its seat, substantially as described.

In testimony whereof I have signed my name to this specification in the presence of two subscribing witnesses.

CUSHING C. HARLOW.

Witnesses:
BENJAMIN P. RYDER,
NATHAN ABBOTT.